(12) United States Patent
Hunt et al.

(10) Patent No.: US 8,849,968 B2
(45) Date of Patent: Sep. 30, 2014

(54) SECURE AND STABLE HOSTING OF THIRD-PARTY EXTENSIONS TO WEB SERVICES

(75) Inventors: Galen C. Hunt, Bellevue, WA (US); James R. Larus, Mercer Island, WA (US); Alexander G. Gounares, Kirkland, WA (US); Raymond E. Endres, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 936 days.

(21) Appl. No.: 11/275,160

(22) Filed: Dec. 15, 2005

(65) Prior Publication Data

US 2007/0011199 A1 Jan. 11, 2007

Related U.S. Application Data

(60) Provisional application No. 60/692,190, filed on Jun. 20, 2005.

(51) Int. Cl.
  *G06F 15/173* (2006.01)
  *G06F 21/53* (2013.01)
(52) U.S. Cl.
  CPC .................................... *G06F 21/53* (2013.01)
  USPC ......................................... 709/223; 709/238
(58) Field of Classification Search
  CPC .......... H04L 69/16; H04L 67/00; H04L 69/00
  USPC ......................................................... 709/223
  See application file for complete search history.

(56) References Cited

U.S. PATENT DOCUMENTS

| 4,885,684 | A | 12/1989 | Austin et al. |
| 4,916,637 | A | 4/1990 | Allen et al. |

(Continued)

FOREIGN PATENT DOCUMENTS

| CN | 1549108 A | 11/2004 |
| EP | 1033648 A2 | 9/2000 |

(Continued)

OTHER PUBLICATIONS

The Architecture of Massive Multiplayer Online Games, Authors: Sladjan Bogojevic, Mohsen Kazemzadeh, Published: Sep. 8, 2003. Department of Computer Science, Lund Institute of Technology, Lund University http://graphics.cs.lth.se/theses/projects/mmogarch/som.pdf.*

(Continued)

*Primary Examiner* — Noel Beharry
(74) *Attorney, Agent, or Firm* — Dan Choi; Judy Yee; Micky Minhas

(57) ABSTRACT

Described herein are one or more computer operating environments that include a standard set of web services via a communications network (e.g., the Internet) and a mechanism for extending the standard set of web services to execute one or more extended web services. Since these extended web services may be produced by an unconfirmed or untrusted source (e.g., a third-party software developer), the described computer operating environments isolate the extended web services from the standard set of web services and from the communication network. Furthermore, each extended web service is an isolated process (isoproc) with a limited ability to communicate with other services. In particular, each isoproc's ability to communicate is limited to only associated defined communication channels over which it has express permission to communicate.

20 Claims, 3 Drawing Sheets

(56) References Cited

U.S. PATENT DOCUMENTS

| | | |
|---|---|---|
| 5,031,089 A | 7/1991 | Liu et al. |
| 5,057,996 A | 10/1991 | Cutler et al. |
| 5,179,702 A | 1/1993 | Spix et al. |
| 5,317,568 A | 5/1994 | Bixby et al. |
| 5,329,619 A | 7/1994 | Page et al. |
| 5,339,443 A | 8/1994 | Lockwood |
| 5,349,682 A | 9/1994 | Rosenberry |
| 5,361,359 A | 11/1994 | Tajalli et al. |
| 5,367,681 A | 11/1994 | Foss et al. |
| 5,455,951 A | 10/1995 | Bolton et al. |
| 5,469,571 A | 11/1995 | Bunnell |
| 5,481,717 A | 1/1996 | Gaboury |
| 5,522,075 A | 5/1996 | Robinson et al. |
| 5,551,051 A | 8/1996 | Silverthorn et al. |
| 5,574,911 A | 11/1996 | D'Angelo et al. |
| 5,590,001 A | 12/1996 | Ino et al. |
| 5,590,281 A | 12/1996 | Stevens |
| 5,666,519 A | 9/1997 | Hayden |
| 5,694,601 A | 12/1997 | White |
| 5,737,605 A | 4/1998 | Cunningham et al. |
| 5,752,032 A | 5/1998 | Keller et al. |
| 5,754,845 A | 5/1998 | White |
| 5,768,532 A | 6/1998 | Megerian |
| 5,794,052 A | 8/1998 | Harding |
| 5,845,129 A | 12/1998 | Wendorf et al. |
| 5,857,195 A | 1/1999 | Hayashi et al. |
| 5,878,408 A | 3/1999 | Van Huben et al. |
| 5,923,878 A | 7/1999 | Marsland |
| 5,931,938 A | 8/1999 | Drogichen et al. |
| 5,938,723 A | 8/1999 | Hales, II et al. |
| 5,944,821 A | 8/1999 | Angelo |
| 5,958,050 A | 9/1999 | Griffin et al. |
| 5,963,743 A | 10/1999 | Amberg et al. |
| 5,974,572 A | 10/1999 | Weinberg et al. |
| 5,991,518 A | 11/1999 | Jardine et al. |
| 6,003,129 A | 12/1999 | Song et al. |
| 6,006,328 A * | 12/1999 | Drake ............................ 726/23 |
| 6,009,476 A | 12/1999 | Flory et al. |
| 6,038,399 A | 3/2000 | Fisher et al. |
| 6,066,182 A | 5/2000 | Wilde et al. |
| 6,072,953 A | 6/2000 | Cohen et al. |
| 6,078,744 A | 6/2000 | Wolczko et al. |
| 6,080,207 A | 6/2000 | Kroening et al. |
| 6,092,189 A | 7/2000 | Fisher et al. |
| 6,115,819 A | 9/2000 | Anderson |
| 6,144,992 A | 11/2000 | Turpin et al. |
| 6,157,928 A | 12/2000 | Sprenger et al. |
| 6,161,051 A | 12/2000 | Hafemann et al. |
| 6,182,275 B1 | 1/2001 | Beelitz et al. |
| 6,202,147 B1 | 3/2001 | Slaughter et al. |
| 6,247,128 B1 | 6/2001 | Fisher et al. |
| 6,279,111 B1 | 8/2001 | Jensenworth et al. |
| 6,292,941 B1 | 9/2001 | Jollands |
| 6,321,334 B1 * | 11/2001 | Jerger et al. ...................... 726/1 |
| 6,324,622 B1 | 11/2001 | Okpisz et al. |
| 6,341,371 B1 | 1/2002 | Tandri |
| 6,351,850 B1 | 2/2002 | van Gilluwe et al. |
| 6,381,742 B2 | 4/2002 | Forbes et al. |
| 6,405,361 B1 | 6/2002 | Broy et al. |
| 6,434,694 B1 | 8/2002 | Slaughter et al. |
| 6,438,549 B1 | 8/2002 | Aldred et al. |
| 6,442,754 B1 | 8/2002 | Curtis |
| 6,446,260 B1 | 9/2002 | Wilde et al. |
| 6,487,723 B1 | 11/2002 | MacInnis |
| 6,542,926 B2 | 4/2003 | Zalewski et al. |
| 6,546,546 B1 | 4/2003 | Van Doorn |
| 6,629,152 B2 | 9/2003 | Kingsbury et al. |
| 6,658,447 B2 | 12/2003 | Cota-Robles |
| 6,715,144 B2 | 3/2004 | Daynes et al. |
| 6,732,220 B2 | 5/2004 | Babaian et al. |
| 6,748,592 B1 | 6/2004 | Porter |
| 6,816,905 B1 | 11/2004 | Sheets et al. |
| 6,817,013 B2 | 11/2004 | Tabata et al. |
| 6,842,782 B1 | 1/2005 | Malik et al. |
| 6,868,539 B1 | 3/2005 | Travison et al. |
| 6,904,519 B2 | 6/2005 | Anand et al. |
| 6,912,692 B1 | 6/2005 | Pappas |
| 6,944,754 B2 | 9/2005 | Zilles et al. |
| 6,973,517 B1 | 12/2005 | Golden et al. |
| 6,977,994 B2 | 12/2005 | Stephenson et al. |
| 6,988,261 B2 | 1/2006 | Sokolov et al. |
| 7,000,092 B2 | 2/2006 | Gehman et al. |
| 7,036,114 B2 | 4/2006 | McWilliams et al. |
| 7,062,764 B2 | 6/2006 | Cohen et al. |
| 7,086,056 B2 | 8/2006 | Fukushima |
| 7,089,289 B1 | 8/2006 | Blackmore et al. |
| 7,155,713 B1 | 12/2006 | Burkhardt et al. |
| 7,167,867 B1 | 1/2007 | Rago |
| 7,200,840 B2 | 4/2007 | Gschwind et al. |
| 7,222,106 B2 | 5/2007 | Block et al. |
| 7,222,341 B2 | 5/2007 | Forbes et al. |
| 7,278,030 B1 | 10/2007 | Chen et al. |
| 7,451,435 B2 | 11/2008 | Hunt et al. |
| 7,454,477 B2 | 11/2008 | Talluri et al. |
| 7,484,245 B1 * | 1/2009 | Friedman et al. ............... 726/27 |
| 7,600,232 B2 | 10/2009 | Hunt et al. |
| 7,694,300 B2 | 4/2010 | Hunt et al. |
| 7,788,637 B2 | 8/2010 | Hunt et al. |
| 7,882,317 B2 | 2/2011 | Hunt et al. |
| 8,020,141 B2 | 9/2011 | Hunt et al. |
| 2001/0029605 A1 | 10/2001 | Forbes et al. |
| 2002/0004852 A1 | 1/2002 | Sadovsky et al. |
| 2002/0099954 A1 | 7/2002 | Kedma et al. |
| 2002/0100017 A1 | 7/2002 | Grier et al. |
| 2002/0143842 A1 * | 10/2002 | Cota-Robles et al. ............ 709/1 |
| 2003/0031404 A1 | 2/2003 | Pedersen |
| 2003/0056084 A1 | 3/2003 | Holgate et al. |
| 2003/0061067 A1 | 3/2003 | Atwal et al. |
| 2003/0061401 A1 | 3/2003 | Luciani, Jr. |
| 2003/0061404 A1 | 3/2003 | Atwal et al. |
| 2003/0084256 A1 | 5/2003 | McKee |
| 2003/0097581 A1 * | 5/2003 | Zimmer ........................ 713/200 |
| 2003/0130854 A1 | 7/2003 | Galanes et al. |
| 2003/0188231 A1 | 10/2003 | Cronce |
| 2003/0191867 A1 | 10/2003 | Czajkowski |
| 2003/0200402 A1 | 10/2003 | Willman et al. |
| 2003/0212990 A1 | 11/2003 | Brodkorb et al. |
| 2003/0221012 A1 | 11/2003 | Herrmann et al. |
| 2003/0233644 A1 | 12/2003 | Cohen et al. |
| 2004/0003324 A1 * | 1/2004 | Uhlig et al. ..................... 714/38 |
| 2004/0015911 A1 | 1/2004 | Hinsley et al. |
| 2004/0025016 A1 | 2/2004 | Focke et al. |
| 2004/0034850 A1 | 2/2004 | Burkhardt et al. |
| 2004/0061067 A1 | 4/2004 | Clauss |
| 2004/0064736 A1 | 4/2004 | Obrecht et al. |
| 2004/0078799 A1 | 4/2004 | Koning et al. |
| 2004/0123273 A1 | 6/2004 | Hammerich et al. |
| 2004/0153991 A1 | 8/2004 | Chen et al. |
| 2004/0187096 A1 | 9/2004 | Dumont |
| 2004/0193819 A1 | 9/2004 | Marinescu et al. |
| 2004/0199763 A1 | 10/2004 | Freund |
| 2004/0226023 A1 | 11/2004 | Tucker |
| 2004/0236861 A1 | 11/2004 | Bondar et al. |
| 2004/0268171 A1 | 12/2004 | Inoue et al. |
| 2005/0005261 A1 | 1/2005 | Severin |
| 2005/0021537 A1 | 1/2005 | Brendle et al. |
| 2005/0050069 A1 | 3/2005 | Vaschillo et al. |
| 2005/0060687 A1 | 3/2005 | Ghazaleh et al. |
| 2005/0071592 A1 | 3/2005 | DeCaro |
| 2005/0071828 A1 | 3/2005 | Brokenshire et al. |
| 2005/0081181 A1 | 4/2005 | Brokenshire et al. |
| 2005/0081203 A1 | 4/2005 | Aguilar et al. |
| 2005/0091658 A1 | 4/2005 | Kavalam et al. |
| 2005/0119902 A1 | 6/2005 | Christiansen |
| 2005/0125789 A1 | 6/2005 | Dijkstra et al. |
| 2005/0188364 A1 | 8/2005 | Cockx et al. |
| 2005/0188372 A1 | 8/2005 | Inoue et al. |
| 2005/0188373 A1 | 8/2005 | Inoue et al. |
| 2005/0203988 A1 | 9/2005 | Nollet et al. |
| 2005/0223239 A1 | 10/2005 | Dotan |
| 2005/0246718 A1 | 11/2005 | Erlingsson et al. |
| 2006/0005082 A1 | 1/2006 | Fossum et al. |
| 2006/0026578 A1 | 2/2006 | Ramchandran et al. |
| 2006/0031815 A1 | 2/2006 | Bhagia et al. |

(56) References Cited

U.S. PATENT DOCUMENTS

| | | |
|---|---|---|
| 2006/0047875 A1 | 3/2006 | Aguilar et al. |
| 2006/0069692 A1 | 3/2006 | Pernia |
| 2006/0085789 A1 | 4/2006 | Laborczfalvi et al. |
| 2006/0123401 A1 | 6/2006 | O'Brien et al. |
| 2006/0123417 A1 | 6/2006 | Hunt et al. |
| 2007/0033592 A1 | 2/2007 | Roediger et al. |
| 2007/0043936 A1 | 2/2007 | Day et al. |
| 2007/0061483 A1 | 3/2007 | Dauger |
| 2007/0094495 A1 | 4/2007 | Hunt et al. |
| 2007/0094673 A1 | 4/2007 | Hunt et al. |
| 2007/0192762 A1 | 8/2007 | Eichenberger et al. |
| 2007/0256080 A1 | 11/2007 | Smith et al. |
| 2007/0283337 A1 | 12/2007 | Kasahara et al. |
| 2007/0288940 A1 | 12/2007 | Keljo |
| 2008/0005750 A1 | 1/2008 | Hunt et al. |
| 2008/0022278 A1 | 1/2008 | Gschwind et al. |
| 2008/0034357 A1 | 2/2008 | Gschwind |
| 2008/0244507 A1 | 10/2008 | Hodson et al. |
| 2008/0244599 A1 | 10/2008 | Hodson et al. |
| 2008/0244682 A1 | 10/2008 | Sparrell et al. |
| 2008/0250414 A1 | 10/2008 | Brokenshire et al. |
| 2010/0162220 A1 | 6/2010 | Cui et al. |
| 2010/0199357 A1 | 8/2010 | Hoffman et al. |
| 2012/0227057 A1 | 9/2012 | Lupu et al. |

FOREIGN PATENT DOCUMENTS

| | | |
|---|---|---|
| EP | 14433988 A | 8/2004 |
| JP | 01292537 | 11/1989 |
| JP | 05119987 | 5/1993 |
| JP | 05181919 | 7/1993 |
| JP | 052224956 | 9/1993 |
| JP | 2002506247 | 2/2002 |
| JP | 2003233521 | 8/2003 |
| JP | 2004513412 | 4/2004 |
| JP | 2004139396 | 5/2004 |
| JP | 2004530191 | 9/2004 |
| JP | 2005129066 | 5/2005 |
| KR | 10-1992-0013166 A | 7/1992 |
| KR | 20010007119 | 1/2001 |
| KR | 20010109271 | 12/2001 |
| RU | 2155373 | 8/2000 |
| RU | 2307388 C2 | 9/2007 |
| RU | 2337398 C2 | 10/2008 |
| WO | WO02093370 A | 11/2002 |
| WO | WO03038599 A2 | 5/2003 |
| WO | WO03088086 | 10/2003 |
| WO | WO2004025491 A1 | 3/2004 |
| WO | WO2004099949 A1 | 11/2004 |
| WO | WO2005036835 | 4/2005 |

OTHER PUBLICATIONS

Watson, et al., "Design and implementation of the Trusted BSD MAC framework", Proceedings of 2003 DARPA Information Survivability Conference and Exposition, Sec. 1&5-7, Apr. 2003, pp. 38-49.

Hunt et al: "Broad New OS Research: Challenges and Opportunities" Retrieved from the Internet: URL: http://research.microsoft.com/os/singularity/publications/hotos2005_broadnewreseach.pdf> [retrieved on Dec. 2, 2008].

Mikunov A., "Rewrite MSil Code on the Fly with the .NET Framework Profiling API", MSDN Magazine (Online) Sep. 2003, Retrieved from the Internet: URL: <<http://msdn.microsoft.com/en-us/magazine/cc188743(printer).aspx>> retrieved onDec. 12, 2008).

Tatsubori et al: "Open Java: A Class-Based Macro System for Java" 2000 [Retrieved from the Internet: URL http://www.springerlink.com/content/n64gdultayqfmcjc/fulltext.pdf> [retrieved on Dec. 2, 2008].

Acharya, et al., "MAPbox: Using Parameterized Behavior Classes to Confine Applications", University of California, Santa Barbara, May 1, 1999, pp. 1-19.

Fraim, "Scomp: A Solution to the Multilevel Security Problem", IEEE, 1983, pp. 26-34.

Kurchuk, et al., "Recursive Sandboxes: Extending Systrace to Empower Applications", retrieved on Sep. 4, 2009 at <<http://web.archive.org/web/20040725140723/http://nsl.cs.columbia.edu/projects/gridlock/systrace_extensions.pdf>>, 2004, pp. 1-16.

"Microsoft Computer Dictionary", retrieved on Sep. 4, 2009 at <<http://proquest.safaribooksonline.com/print?xmlid=0735614954/ch20>>, Fifth Edition, pp. 1-2.

Perrine, et al., "An Overview of the Kernelized Secure Operating System (KSOS)", Proceedings of the 7th DoD/NBS Computer Security Conference, 1984, pp. 0-14.

Perrine, "The Kernelized Secure Operating System (KSOS)", ;login: The Magazine of USENIX & SAGE, vol. 27, No. 6, 2002, pp. 36-40.

Provos, "Improving Host Security with System Call Policies", Proceedings of the 12th USENIX Security Symposium, USENIX Association, Aug. 2003, pp. 257-271.

"Variable Scope", retrieved on Sep. 4, 2009 at <<http://irc.essex.ac.uk/www.iota-six.co.uk/d/d5_variable_scope.asp>>, Scope, 2003, pp. 1-5.

Back et al., "Processes in KaffeOS: Isolation, Resource Management, and Sharing in Java", Proceedings of the 4th USENIX Symposium, Dec. 6, 2004, pp. 333-346.

Chaki et al, "Types as Models: Model Checking Message-Passing Programs", Proceedings of the 29th ACM Symposium on Principles of Programing Lanuages, 2002, pp. 45-57.

Hunt et al., "Singularity Technical Report 1: Singularity Design Motivation", Microsoft Research, 2004 Microsoft Corporation, pp. 1-4.

McNamee et al., "An Attribute Grammar Approach to Compiler Optimization of Intra-Module Interprocess Communication", International Journal of Parallel Programming, vol. 20, Nov. 3, 1991, pp. 181-202.

Tanenbaum, "Modern Operating Systems", Prentice Hall Inc., 2001, pp. 168-175.

Tost, "Loosely typed versus strongly typed Web services", Sep. 2, 2005, IDM, pp. 1-14.

Mexican Office Action mailed Aug. 15, 2011 for Mexican patent application No. MX/a/2008/005402, a counterpart foreign application of U.S. Appl. No. 11/428,162, 2 pages.

U.S. Appl. No. 60/692,190 entitled "Secure and Stable Hosting of Third-Party Extension to Web Services," Hunt et al, filed Jun. 20, 2005.

U.S. Appl. No. 60/730,546 entitled "Programming Language Support for Software Isolation Processes (SIPs) and Isolated Extensions and Device Drivers Upon SIPs," Hunt et al, filed Oct. 26, 2005.

Berman, et al., "Application-Level Scheduling on Distributed Heterogeneous Networks (Technical Paper)", available at least as early as Mar. 6, 2007, at <<http://citeseer.ist.psu.edu/cache/papers/cs/30161/http:zSzzSzwww-cse.ucsd.eduzSz~gshaozSzpaperszSzsup96.pdf/application-level-scheduling-on.pdf>>, pp. 1-29.

Chinese Office Action mailed May 19, 2011 for Chinese Patent Application No. 200680040116.1, a counterpart foreign application of U.S. Appl. No. 11/428,096.

Japanese Office Action mailed May 24, 2011 for Japanese Patent Application No. 2005-354079, a counterpart foreign application of US Patent No. 7,451,435.

Khokhar, et al., "Heterogeneous Computing: Challenges and Opportunities", available at least as early as Mar. 6, 2007, at <<http://meseec.ce.rit.edu/eecc722-fall2002/papers/hc/1/r6018.pdf>>, IEEE, 1993, pp. 18-27.

Lyonnard, et al., "Automatic Generation of Application-Specific Architectures for Heterogeneous Multiprocessor System-on-Chip", available at least as early as Mar. 6, 2007, at <<http://delivery.acm.org/10.1145/380000/379015/p518-lyonnard.pdf?key1=379015&key2=7123613711&coll=GUIDE&dl=GUIDE&CFID=16158147&CFTOKEN=58686892>>, ACM, 2001, pp. 518-523.

Russian Office Action mailed Apr. 18, 2011 for Russian Patent Application No. 2008116714, a counterpart foreign application of U.S. Appl. No. 11/428,096.

Sun, et al., "Synthesis of Application-Specific Heterogeneous Multiprocessor Architectures using Extensible Processors", available at

(56) References Cited

OTHER PUBLICATIONS least as early as Mar. 6, 2007, at <<http://ieeexplore.ieee.org/iel5/9501/30140/01383333.pdf?is Number=>>, IEEE, 2005, pp. 1-6.
Mexican Office Action mailed Feb. 9, 2012 for Mexican patent application No. MX/a/2008/005402, a counterpart foreign application of U.S. Appl. No. 11/428,162, 7 pages.
Chinese Office Action mailed Jun. 4, 2012 for Chinese patent application No. 200680021042.7, a counterpart foreign application of U.S. Appl. No. 11/275,160, 6 pages.
Mexican Office Action mailed Apr. 26, 2011 for Mexican patent application No. MX/a/2008/005403, a counterpart foreign application of U.S. Appl. No. 11/428,096.
Final Office Action for U.S. Appl. No. 11/694,339, mailed on Aug. 3, 2011, Orion Hodson, "Master and Subordinate Operating System Kernels for Heterogeneous Multiprocessor Systems".
Aiken et al., "Deconstructing Process Isolation", retrieved from http:doi.acm.org/10.1145/1178597.1178599, In Proceedings of the 2006 Workshop on Memory System Performance and Correctness, 2006, 10 pages.
Fahndrich et al., "Language Support for Fast and Reliable Message-based Communication in Singularity OS", retrieved from http://doi.acm.org/10.1145/1218063.1217953. SIGOPS Operating Systems Rev. 40, 2006, 14 pages.
Grosso, "Java RMI", O'Reilly Media, 2002, 574 pages.
Office action for U.S. Appl. No. 11/428,162, mailed on Jun. 27, 2013, Hunt et al., "Statically Verifiable Inter-ProcessCommunicative Isolated Processes", 25 pages.
Wikipedia, "Strong and weak typing", retrieved from http:en.wikipedia.org/w/index.php?title=Strong_and_weak_typing&oldid=560035416, 2013, 1 page.
Gay et al., "Session Types for Inter-Process Communication", University of Glasgow, Department of Computing Science Technical Report (TR-2003-133), Mar. 2003, 33 pages.
Huang et al., "Securing Web Application Code by Static Analysis and Runtime Protection", Proceedings of the 13th International Conference on World Wide Web, ACM, New York, NY, 2004, 12 pages.
European Office Action mailed Mar. 14, 2013 for European patent application No. 11009734.2, a counterpart foreign application of US patent No. 8,020,141, 6 pages.
European Office Action mailed Mar. 14, 2013 for Euroopean patent application No. 11009735.9, a counterpart foreign application of USpatent No. 8,020,141, 8 pages.
European Office Action mailed Mar. 27, 2013 for European patent application No. 05111731.5, a counterpart foreign application of US patent application No. 8,020,141, 8 pages.
Japanese Office Action mailed Jan. 22, 2013 for Japanese patent application No. 2005-352581, a counterpart foreign application of US patent No. 8,020,141, 8 pages.
Chinese Office Action mailed Jul. 1, 2011 for Chinese patent application No. 200680021042.7, a counterpart foreign application of U.S. Appl. No. 11/275,160.
Acceta et al.; "A New Kernel Foundation for UNIX Development", In Summer USENIX Conference, Atlanta, GA, Jun. 1986, pp. 93-112.
Back et al.; "Processes in KaffeOS: Isolation, Resources Management, and Sharing in Java"; In Proceedings of the 4th USENIX Symposium on Operating Systems Design & Implementation (OSDI), San Diego, CA, Oct. 2000, 14 pages.
Dorward et al; "The Inferno Operating System"; Bell Labs Technical Journal, 2 (1), Winter 1997, pp. 5-18.
Engler et al.; "Exokernel: an Operating System Architecture for Application-Level Resource Management"; In Proceedings of the Fifteenth ACM Symposium on Operating System Principles, Cooper Mountain Resort, Co, 1995, pp. 251-266.
Goldberg et al.; "Smalltalk-80: The Language and Its Implementation"; Addison-Wesley, May 1983, 6 pages.
Golm et al.; "The JX Operating System"; In Proceedings of the USENIX 2002 Annual Conference, Monterey, CA, Jun. 2002, pp. 45-58.

Golm et al., "Beyond Address Spaces—Flexibility, Preformance, Protection, and Resource Management in the Tpe-Safe JX Operatin System", Proc. of the 8th Workshop on Hot Topics in Operating Systems, May 2001, pp. 1-6.
Hartig et al.; "The Perfromance of u-kernel-based Systems"; In Proceedings of the Sixteenth ACM Symposium on Operating Systems Principles (SOSP '97), Saing Malo, France, 1997, pp. 66-77.
Hawblitzel et al.; "Implementing Multiple PRotection Domains in Java"; In Proceedings of the 1998 USENIX Annual Technical Conference, New Orleans, LA, Dec. 1998, pp. 259-270.
Hawblitzel et al.; "Luna: A Flexible Java Protection System"; In Proceedings of the Fifth ACM Symposium on Operating System Design and Implementation (OSDI'02), Boston, MA, 2002, pp. 391-402.
"JSR-000121 Application Isolation API Specification"; available at http://jcp.org/aboutJava/communityprocess/pfd/jsr121/index.html; printed Sep. 7, 2006, 1 page.
"JSR 121: Application Isolation API Specification" Java Specification Requests, printed Sep. 7, 2006, 7 pages.
Rajamani et al.; "Conformance Checking for Models of Asynchronous Message Passign Software"; In Proceedings of the International Conference on Computer Aided Verification (CAV 02), Springer, Copenhagen, Denmark, Jul. 2002, pp. 166-179.
Redell et al.; "Pilot: An Operating System for a Personal Computer"; Communications of the ACM, 23 (2), 1980, pp. 81-92.
Rosenblum et al.; "The Impact of Architectural Trends on Operating System Performance"; In Proceedings of the Fifteenth ACM Symposium on Operating System Principles, Copper Mountain Resort, CO, 1995, pp. 285-298.
Swift et al; "Improving the Reliability of Commodity Operating Systems"; In Proceedings of the 19th ACM Symposium on Operating Systems Principles (SOSP '03), Bolton Landing, NY, 2003, pp. 207-222.
Swinehart et al.; "A Structural View of the Cedar Programming Environment"; ACM Transactions on Programming Languages and Systems, 8 (4), 1986, pp. 419-490.
Wahbe et al.; "Efficient Software-Based FAult Isolation"; In Proceedings of the Fourteenth ACM Symposium on Operating System Principles, Asheville, NC, 1993, pp. 203-216.
Weinreb et al.; "Lisp Machine Manuel"; Symbolics, Inc., Cambridge, MA, Jul. 1981.
Wood et al.; "An In-Cache Address Translation Mechanism"; In Proceedings of the Thirteenth Annual International Symposium on Computer Architecture, Jun. 1986, pp. 158-166.
Extended European Search Report mailed Aug. 27, 2013 for European patent application No. 08733009.8, 12 pages.
Goble, et al., "A Dual Processor VAX 11/780", ACM Sigarch Computer Architecture News, vol. 10, No. 3, Apr. 1982, pp. 291-298.
Hunt, et al., "An Overview of the Singularity Project", http://research.microsoft.com/pubs/52716/tr-2005-135.pdf.
Hunt, et al., "Broad News OS Research: Challenges and Opportunities", Internet citation, Jun. 2005, pp. 1-6, retrieved from the internet at http://research.microsoft.com/os/singularity/publications/hotos2005_broadnewresearch.pdf, retrieved on Dec. 2, 2008.
Japanese Office Action mailed Aug. 20, 2013 for Japanese patent application No. 2005-352581, a counterpart foreign application of US Patent Application 8,020,141, 8 pages.
Kagstrom, et al., "The application kernel approach—a novel approach for adding SMP support to uniprocessor operating systems", Software Practice & Experience, Wiley & Sons, Bognor Regis, GB, vol. 36, No. 14, Nov. 25, 2006, pp. 1563-1583, retrieved on Jun. 22, 2006.
Muir, et al., "AsyMOS—An Asymmetric Multiprocessor Operating System", Open Architectures and Network Programming, 1998 IEEE San Francisco, CA, USA, Apr. 2-4, 1998, pp. 25-34.
Japanese Office Action mailed Sep. 9, 2011 for Japanese patent application No. 2008-518169, a counterpart foreign application of U.S. Appl. No. 11/275,160, 9 pages.
Office Action for U.S. Appl. No. 11/694,455, mailed on Aug. 17, 2011, 12 pgs.
Mexican Office Action mailed Dec. 15, 2011 for Mexican patent application No. MX/a/2008/005403, a counterpart foreign application of US patent No. 8,074,231, 4 pages.

(56) References Cited

OTHER PUBLICATIONS

Chinese Office Action mailed Mar. 1, 2012 for Chinese patent application No. 200680021042.7, a counterpart foreign application of U.S. Appl. No. 11/275,160, 7 pages.
Chinese Office Action mailed Mar. 23, 2012 for Chinese patent application No. 200680040116.1, a counterpart foreign application of US patent No. 8,074,231, 6 pages.
European Office Action mailed Feb. 17, 2012 for European patent application No. 05111731.5, a counterpart foreign application of US Patent Application 8,020,141, 8 pp.
Extended European Search Report mailed Feb. 20, 2012 for European patent application No. 11009735.9, 8 pages.
Extended European Search Report mailed Feb. 23, 2012 for European patent application No. 11009734.2, 7 pages.
Hawblitzel, et al., "A Case for Language-Based Protection", Internet citation, Mar. 1998, pp. 1-12, retrieved from the Internet at http://chrishawblitzel.net/publish/tr98_1670.ps on Feb. 9, 2012.
Japanese Office Action mailed Jan. 27, 2012 for Japanese patent application No. 2008-537770, a counterpart foreign application of US patent No. 8,074,231, 6 pages.
Japanese Office Action mailed Mar. 13, 2012 for Japanese patent application No. 2008-518169, a counterpart foreign application of U.S. Appl. No. 11/275,160, 4 pages.
Japanese Office Action mailed Mar. 30, 2012 for Japanese patent application No. 2008-537768, a counterpart foreign application of U.S. Appl. No. 11/428,162, 5 pages.
Japanese Office Aciton mailed Apr. 17, 2012 for Japanese patent application No. 2005-352581, a counterpart foreign application of US patent No. 8,020,141, 4 pages.
Japanese Office Action mailed Dec. 16, 2011 for Japanese patent application No. 2005-352581, a counterpart foreign application of US patent No. 8,020,141, 6 pages.
Japanese Office Action mailed Dec. 2, 2011 for Japanese patent application No. 2008-537768, a counterpart foreign application of U.S. Appl. No. 11/428,162, 10 pages.
"The JX Operating System" Michael Golm, Meik Felser Christian Wawersich, and Juergen Kleinoeder 2002 USENIX Annual Technical Conference, Jun. 10-15, 2002, Monterey, CA, pp. 45-58.
"Trademark Electronic Search System (TESS) from the USPTO database" for "Windows" trademark of Microsoft filed in USPTO Aug. 20, 1999; http://tess2.uspto.gov/bin/gate.exe?f=doc&state=n00gan.5.26.
Microsoft Press Computer Dictionary, Second Edition, 1994, Published by Penguin Books, Ltd., pp. 23-24 and p. 279.
Microsoft Press Computer Dictionary Third Edition: 1997 3 pages.
Pike, et al., "Plan 9 from Bell Labs", Computing Systems, Vol 8 #3, Summer 1995, pp. 221-254.
Pike, et al, "The Use of Name Spaces in Plan 9", Operating Systems Review, vol. 27, #2, Apr. 1993, pp. 72-76.
Korean Office Action mailed Apr. 9, 2013 for Korean patent application No. 10-2007-7029343, a counterpart foreign application of U.S. Appl. No. 11/275,160, 9 pages.
Korean Office Action mailed May 13, 2013 for Korean patent application No. 10-2008-7010060, a counterpart foreign application of US patent No. 8,074,231, 5 pages.
Seo, et al., "Performance Evaluation of Dynamic Seamless Zone Server Model for Massively Multiplayer Online Game", Model for Massively Multiplayer Online Game, Division of Media, Ajou University, 2004.
Abbaspour et al., "Retargetable Binary Utilites", ACM, <http://ieeeplore.ieee.org/stamp.jsp?tp=&arnumber=1012645>, 6 pages, DAC '02 Proceedings of the 39th Annual Design Automation Conference, pp. 331-336, 2002.
Chinese Office Action mailed Sep. 5, 2012 for Chinese patent application No. 200680040116.1, a counterpart foreign application of US patent No. 8,074,231, 6 pages.
Japanese Office Action mailed Aug. 3, 2012 for Japanese patent application No. 2005-352581, a counterpart foreign application of US patent No. 8,020,141, 5 pages.
"Kernel Module Packages Manualfor CODE 9",Novel/SUSE, 2006, <http://www.suse.de/~agruen/KMPM/old/KernelModulePackagesManual-CODE9.pdf, 15 pages.
Korean Office Action mailed Oct. 10, 2012 for Korean patent application No. 10-2007-7029343, a counterpart foreign application of U.S. Appl. No. 11/275,160, 5 pages.
Sbaraglia et al., "A Productivity Centered Application Performance Tuning Framework", ICST, 2007, <http://delivery.acm.org/10.1145/135000/1345326/a49-sbaraglia.pdf>, 10 pages.

* cited by examiner

SECURE AND STABLE HOSTING OF THIRD-PARTY EXTENSIONS TO WEB SERVICES

RELATED APPLICATIONS

This application claims priority to U.S. Provisional Patent Application Ser. No. 60/692,190 filed Jun. 20, 2005, the disclosure of which is incorporated by reference herein.

BACKGROUND

Some major commercial Web services (e.g., e-retailers, search engines, etc.) have a platform consisting of a multitude of services (e.g., over 200) that are combined to build their web applications. They produce a software developer's kit (SDK) to allow third parties to create new applications using those services (through web protocols). Commercial Web services want third parties to do so because it drives traffic, advertising, and/or sales into the commercial Web services. The third parties want to build these applications because they receive money from the commercial Web services for each sale they drive.

The problem is that the commercial Web services have no good way of hosting the third party's code within their platform. With existing technology, the $3^{rd}$ party hosts their own web site. This is bad for the third party because they must build a web site, acquire servers and network connections, and manage and operate their servers (even if they pay someone to host their servers). Depending on the specific scenario, this can be a very complex task requiring expertise in networking, security, distributed systems, system scaling, and so forth. This situation is bad for the commercial Web services because it creates a barrier that discourages new third parties from developing extensions to their platform.

The commercial Web services do not host the third party's code because there is no cheap and secure way to do so. The commercial Web services' conventional choices to host the third parties code are basically: put it on its own server (very expensive), put it in its own software-based virtual machine using a virtual machine monitor (VMM) like VMWare™ or Virtual Server (pretty expensive), or trust it (insecure).

Even with the first two options, the third party's code has access to a full network stack, so the commercial Web services must put firewalls (potentially expensive stateful firewalls) around it to keep it from communicating inappropriately with services' servers or to keep it from performing inappropriate actions, such as sending unsolicited spam to the outside world. Another impractical solution is for the commercial Web service to run the third party code a language-based virtual machine, such as Sun's Java Virtual Machine (JVM) or .NET AppDomains. While much cheaper than physical hardware or VMM solutions, the language-based VM solutions are inflexible, severely limiting the structure of third party code that can be safely run. Also, language-based VM solutions sacrifice security by enlarging the vulnerability surface and because they cannot adequately constrain resource usage.

The commercial Web services have no conventional approach that allows them to cheaply and securely host third party code in their data centers using the services' operations expertise. The independent software venders (ISVs) have no conventional approach that gives them the flexibility to write a new extension as dictated by their design needs and easily drop it into the commercial Web services' servers, securely and cheaply.

Using only the available conventional approaches, a developer who creates or extends an existing web application with code must become well versed in the expertise of running a data center. The developer must endure the hassle of server procurement, server management, patching, operations planning, service deployment, load balancing, backup, etc.

For example, let's say a fictional company, which we will call the Hope Software Corporation (HSC), wanted to extend a service called the World Mapping Web Service (WMWS). HSC wants to extend the WMWS service by plotting houses from various web sites and the multiple-listing services (MLS) real estate listings onto a satellite map from WMWS. Assuming that WMWS exposes the necessary application programming interfaces (APIs) to build this application, HSC still has to handle the operations burden imposed by being a web application. Say HSC's application is really popular and gets featured in an extremely popular web site. Now, HSC has to make sure their application is scalable to handle the extra load which can occur in a matter of hours. HSC has to make sure their application gracefully fails over in case one of their machines dies. HSC knows that if they cannot service their customers 24×7, someone else will.

For another example closer to home, let's say Bob modifies a service called Sharing Documents Web Service (SDWS). Bob modifies SDWS with a bit of workflow logic to route documents for approval in his workgroup. Bob's workgroup now has to worry about the hassle of obtaining a server, deploying the operating system and SDWS, patching, backing it up, etc. just because of a little extra customization. And the IT department is not completely off the hook anyway. There's now another one-off deployment of SDWS floating in the enterprise and any lapse in management of that server poses extra security risks and support costs.

In still another example, say HSC could modify (herein "mod") a massively multiplayer online game (MMOG) like Everquest™ or World of Warcraft™. In doing so, HSC creates its own zones, monsters, and artificial intelligence (AI). Despite the huge success of mods for client-side games, mods for MMOGs are nowhere to be seen because the MMOG operators do not have a secure and reliable mechanism to isolate mods on MMOG servers.

There are an endless number of scenarios where developers want to extend existing web services. Even when a network-based interface to the web service is exposed, extending a web service is expensive and difficult because the programmers developing the extension are forced to become service providers in addition to developing the code.

There are of course hosted data centers where a third party can rent managed servers and run their code. But in this case, the third party essentially gets just a hardware box. The third party is not extending an existing web service such as one for online advertising, collaboration, business processing, gaming, etc. The third party still needs to worry about service deployment, load balancing, backup, etc. And there is still the cost involved. If HSC just wants to try out an idea, the cost just for hosting can be nearly a thousand dollars a year to use a service provider.

Thusfar, we have only described Internet scenarios. It is worth explicitly pointing out that the techniques described here are applicable to wide range of computation scenarios. For example, the "web service" that needs to be extended may actually be any arbitrary computation node, such as a mobile phone device or personal computer. It could even be an arbitrary computation system, such as a peer to peer or grid network. Consider a project like the SETI@home distributed processing system for analyzing radio signals. In this setup, each the owners of each PC participating need to "trust" the SETI@home software to not be malicious. However, this software is relatively fixed—it is not possible for an arbitrary astronomer to for example, quickly use the resources of those thousands of computers to evaluate a new radio signal analysis algorithm.

This scenario is exactly analogous to the web services scenarios described earlier, only in this case, the "commercial web service" is actually a distributed computation grid. Either way, it can be modeled as a web service needing extensions.

SUMMARY

Described herein are techniques to isolate a third-party extension from other components of web services while expressly defining and limiting with who and how the third-party extension has permission to interact or communicate. Described herein are one or more computer operating environments that include a standard set of web services via a communications network (e.g., the Internet) and a mechanism for extending the standard set of web services to execute one or more extended web services. Since these extended web services may be produced by an unconfirmed or untrusted source (e.g., a third-party software developer), the described computer operating environments isolate the extended web services from the standard set of web services and from the communication network. Furthermore, each extended web service is an isolated process (isoproc) with a limited ability to communicate with other services. In particular, each isoproc's ability to communicate is limited to only associated defined communication channels over which it has express permission to communicate.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same numbers are used throughout the drawings to reference like elements and features.

DETAILED DESCRIPTION

Figure 1:
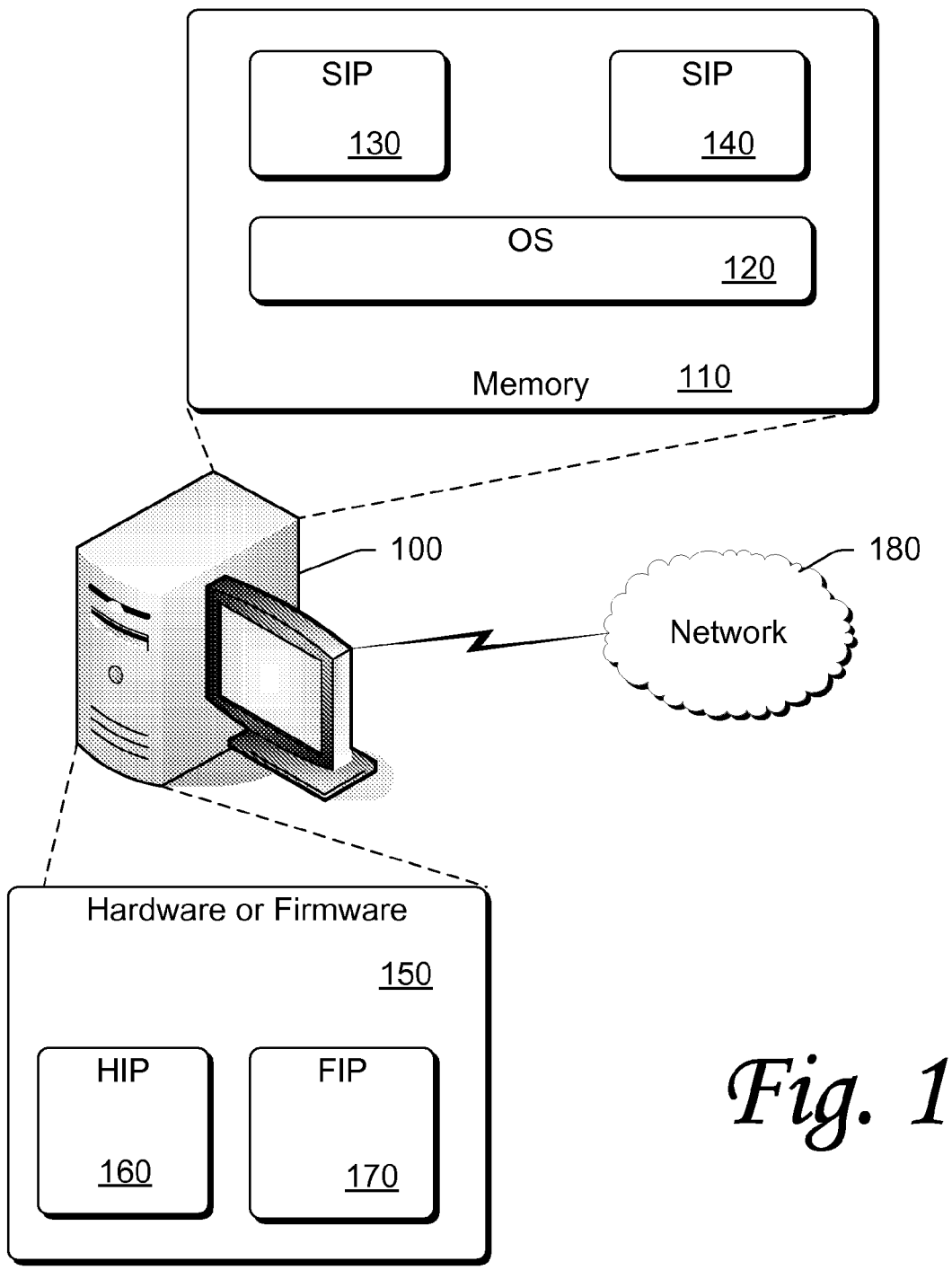
FIG. 1 is a block diagram of an implementation described herein.

Described herein are techniques to isolate an extension written by a third-party developer (also know as Independent Software Vendor, ISV) from other components of web services while expressly defining with who (and how) the third-party extension has permission to interact and communicate. The third-party extension is isolated from other applications and services so that untrusted 3rd party code can be executed without concern (with respect to security, stability and reliability).

Described herein are one or more implementations of a computer-operating environment (e.g., an operating system of a web server) which offers an easy-to-maintain and secure hosting environment for executing third-party software. A typical computer-operating environment include a standard set of web services via a communications network (e.g., the Internet) and a mechanism for otherwise unconfirmed or untrusted sources (e.g., a third-party software developers) to add extensions to that standard set of web services.

To ensure security, the described computer operating environments isolate the extended web services from the standard set of web services and from the communication network. Furthermore, each extended web service is an isolated process (isoproc) with a limited ability to communicate with other services. In particular, each isolated processability to communicate is limited to only defined communication channels over which it has express permission to communicate.

Context and Exemplary Scenarios

The exemplary embodiments described herein are complementary to existing web services provided by many software companies and those provided by outside parties. The exemplary embodiments are targeted at developers like Bob and the Hope Software Company (HSC), who were introduced in the "Background" section. These developers want to extend existing services or create new services without worrying about service operations.

For example, suppose that HSC is looking for house to buy in the few neighborhoods he cares about in Seattle: Queen Anne and Leschi. HSC spends nearly 45 minutes a day combing through the homes for sale listings on various web-based real estate listings services. HSC sees World Mapping Web Service (WMWS) and wonders how great it would be to see the houses for sale plotted on a map in WMWS. This is just a side project for HSC to do in his spare time.

HSC writes his code to display data from various web-based real estate listings services onto WMWS. It is then trivial for HSC to "publish" this solution so that his friends can use it also since HSC never has to think about where to host it, how much it costs, buying a server, etc. As HSC's solution grows in popularity, HSC starts adding more features like crime statistics, items for sale, more cities, mobile device access, and alerts. HSC purchases a domain name as well as various search engine keywords to drive traffic to his application. The web service (which employs at least one of the exemplary embodiments described herein) continues to run his solution for his user base, which now numbers in the millions.

For this scenario, Web Service hosts a cluster of machines running at least one of the exemplary embodiments on which ISVs build their applications to the side of existing infrastructure. One idea is to take an existing web service and augment it with servers in its data center that employ the at least one of the exemplary embodiments. Any third party extensibility code runs in the isolation boundary provided by at least one of the exemplary embodiments described herein. To get data, the code just uses the standard web service APIs to access the existing service infrastructure.

The exemplary embodiments may be a platform for a massively multiplayer online game (MMOG). Allowing end-users to modify ("mod") their MMOG experience will improve their experience and is likely to decrease subscriber churn. A MMOG is an example of a large-scale multi-user distributed game or simulator.

Hard-core gamers who sometimes spend upwards of forty hours a week playing typically play MMOGs. One significant source of churn in the MMOG industry results from boredom, when users feel they have mastered all challenges a game has to offer, and move on after investing one year or more in a game world. The typical user spends about two years playing a game. A decrease in the subscriber base can obviously make a significant dent in revenue.

One of the ways to minimize subscriber churn is to continually enhance the game with new levels, art, characters, etc. First-person shooter games have been enormously successful in harnessing a community of users to create 'mods.' These mods include sophisticated new art, revised game engines, new levels, new themes, new characters, etc. MMOGs on the other hand have not been able to reap the rewards of user contributions.

An exemplary embodiment described herein may offer a mod toolkit with game studios. This way, the users will have the ability to create mods and the MMOG can feel confident that these mods will run safely and securely.

Four key desirable features that an approach using the exemplary embodiment described herein exhibits: Security, Scalability, Reliability, and Low Cost.

The security tenet is a primary driving feature. Security means that the system can take arbitrary unknown code and run it safely, without fear of corrupting the operating system itself, the data center, or other programs. There at least two interesting cases here: the malicious code writer and the buggy code writer. From the point of view of the security model, both need to be handled well. More specifically, the Web Services should not be adversely affected because an extension-based add-in had a bug or a malicious code. Adversely affect could mean, for example, having to shut down services, data corruption, impersonation of services, etc.

In terms of reliability, there are really two perspectives: reliability of the solution itself, and reliability of the data center. The data center should not encounter outages or other reliability problems due to buggy third party code. Similarly, the author of correct code would not want failures in the data center (e.g. a hard drive failure) to affect his or her code.

In addition, the exemplary embodiment may employ a "cloaking mechanism" which is intended to hide data from the extension. For example, the exemplary embodiment may process a purchase order for a customer of the web service, but the web service may not want to provide some of the sensitive info to the extension. Instead, the web service replaces the sensitive info with dummy or replacement info when providing this info to the extension. Therefore, the extension never discovers this sensitive info.

Isolated Process (IsoProc)

FIG. 1 shows a typical host computing system 100, which has one or more processing cores (e.g., processors and related hardware) and one or more memory subsystems. The host computing system 100 may be single computer or a plurality of interconnected computers, which are working cooperatively.

As shown in FIG. 1, the host computing system 100 has two different memory subsystems: Memory 110 and hardware/firmware 150. Memory 110 is an example of typical memory subsystems in which software may be stored. The memory 110 may be any available processor-readable media that is accessible by host computing system 100. The memory 110 may be either volatile or nonvolatile media. In addition, it may be either removable or non-removable media. Hardware/firmware 150 is an example of a typical hardware (e.g., ROM) or firmware in which computer-executable instructions may be stored.

In FIG. 1, the memory 110 and the hardware/firmware 150 are depicted as two separate areas to emphasize their different nature, but in practical terms, a high-level operating system may not distinguish greatly between them. Indeed, the executable-instructions stored in the hardware/firmware 150 may be part of the addressable memory range of the memory 110.

The host computing system 100 has an operating system (represented by OS kernel 120 in the memory 110) which provides the architecture for the use of software isolated processes (SIP), such as SIP 130 and SIP 140. In the host computing system 100, non-kernel code in this OS runs in a SIP. SIPs communicate with each other, with the OS, and with a communications network 180 via strongly typed communication channels. More particularly, a SIP can only communicate with other processes and the kernel via communication channels that it has express permission (from the OS) to use. This permission defines and who and how an SIP communicates with other processes, with the OS, and with a communications network 180.

As depicted in FIG. 1, hardware/firmware 150 shows examples of a hardware isolated processes 160 (HIP) and a firmware isolated process 150 (FIP). These are effectively identical to an SIP except that their code is not stored in a working primary memory (like memory 110).

To be inclusive in terminology, the term "isolated process" and its shorted representation "isoproc" is used herein. It is defined to be an "isolated process" and examples of which expressly include SIPs, HIPs, and FIPs. So, unless the context clearly indicates otherwise, references herein to "isoproc" include the concepts of SIPs, HIPs, and/or FIPs.

An isoproc is a little different from a traditional OS process. An isoproc has a strong isolation boundary (much like a VM in terms of isolation). One isoproc cannot communicate or otherwise change the state of another isoproc outside of communication through typed channels—there is no shared memory concepts or the like. This isolation boundary alone is a strong and important layer in the security model. Indeed, an isoproc can only communicate via the communication channels for which it has express permission to use for such communication.

The express permission granted by the OS defines communications properties of an associated defined communication channel of a subject isoproc, wherein such properties include one or more of the following:

with which other isoprocs that a subject isoproc may communicate;
resources on the system that the isoproc may access across a channel;
other processes on the system that the isoproc may interact with;
ability to access communication mechanisms (e.g. TCP or web protocols) to communicate with other systems;
ability to communicate with specific systems;
type of communication;
rate, amount, and time of communication.

The security model is further strengthened because the OS knows exactly what code is running in each isoproc. The code in an isoproc runs in a distinct isolation region with well-known and describable communication characteristics. Furthermore, the code running in each software-based isoproc is verified to guarantee memory safety and to not contain any hardware-privileged instructions. Multiple isoprocs can be run in the same hardware protection domain, even the hardware protection domain of the OS kernel 120. By running in the same hardware protection domain the OS kernel 120, the cost of invoking code in separate isoprocs is extremely low.

The following U.S. Patent Applications are incorporated herein by reference:
application Ser. No. 11/118,684, titled "Inter-Process Interference Elimination" and filed on Apr. 29, 2005;
application Ser. No. 11/007,655, titled "Inter-Process Communications Employing Bi-directional Message Conduits" and filed on Dec. 7, 2004;
application Ser. No. 11/007,808, titled "Self-Describing Artifacts and Application Abstractions" and filed on Dec. 7, 2004.

The embodiments described herein employ the techniques described in these incorporated-herein references. In particular, techniques for Inter-Process Interference Elimination and Inter-Process Communication are employed for isoprocs. In other words, these techniques are employed to isolate a third-party extension from other components of the web services while expressly defining who it has permission to communication with.

Exemplary Environment

Figure 2:
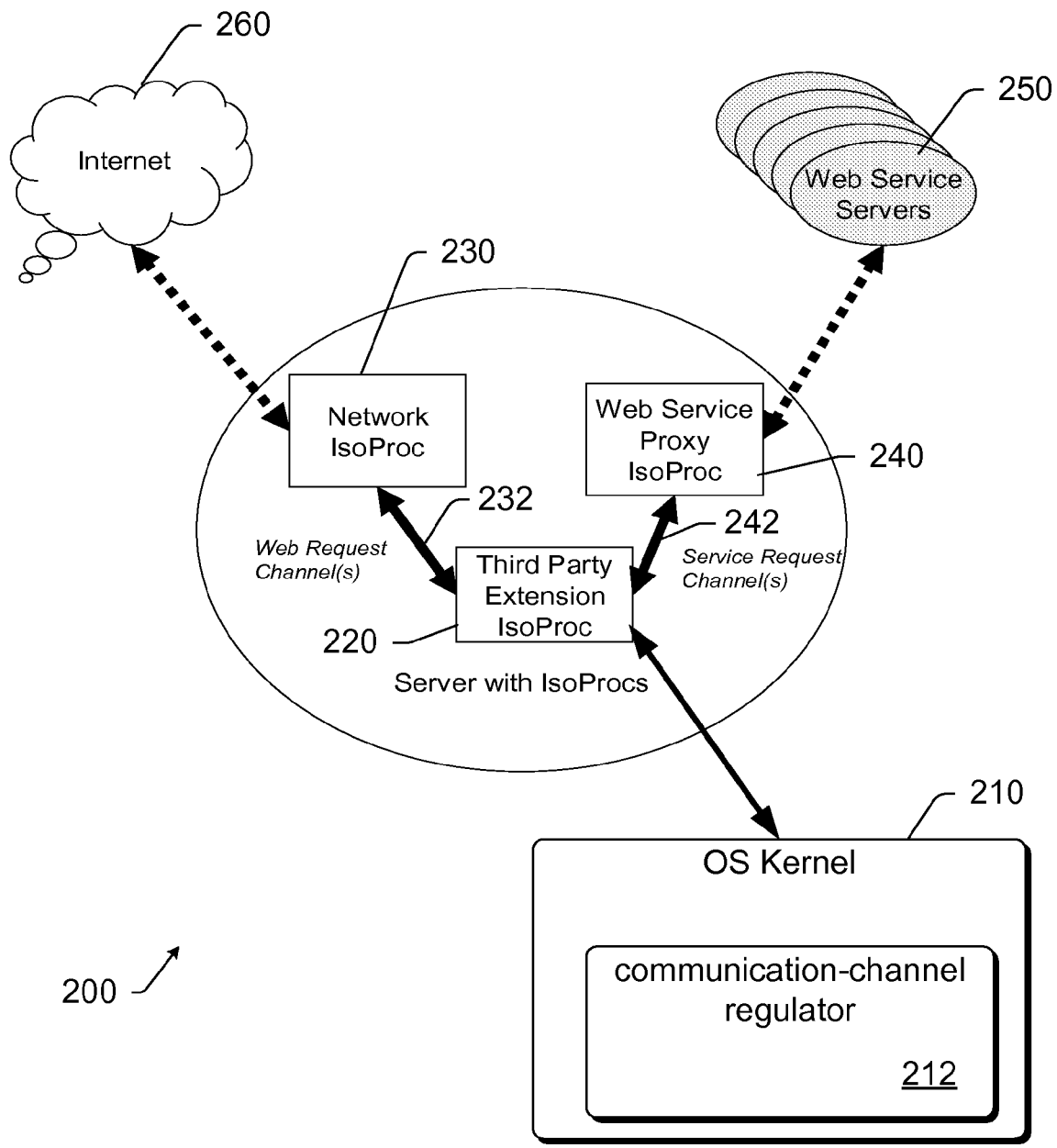
FIG. 2 is a block diagram of an implementation described herein.

FIG. 2 shows a host computing environment 200 (such as a web server) with an operating system (represented by OS kernel 210) which supports and provides for isoprocs. The host computing environment 200 provides an inexpensive and secure hosting environment for running third-party code, such as extension isoproc 220. The third party (e.g., a software or web-service developer) writes their extension isoproc 220 so that the code runs in its own isoproc in the host computing environment 200.

The OS 210 includes a communication-channel regulator 212, which is the component of the OS that expressly grants permission for isoprocs to use communication channels. That permission defines communications properties of the defined communication channel. Without express permission from the communication-channel regulator 212, the extension isoproc 220 literally cannot communicate with any other code anywhere in the universe (not even the OS network stack or the OS file system).

For this exemplary embodiment, the extension isoproc 220 receives incoming requests from a network service isoproc 230 over a communication channel 232. The network service isoproc 230 acts as an intermediary between the extension isoproc 220 and an external communications network 260, such as the Internet. The network service isoproc 230 is responsible handling communication between the extension isoproc 220 and the outside world (e.g., the Internet 160). In an alternative embodiment, the network service isoproc 230 can be replaced with a direct connection to the external communications network 260 when the extension isoproc 220 has statically checked and verified to not execute any forbidden operation against the external communications network.

The extension isoproc 220 communicates to a web-service proxy isoproc 240 on the host computing system using an OS-provided cross-process communication channel 242. The web-service proxy isoproc 240 acts as an intermediary between the extension isoproc 220 and other internal web services 250, such as the database system containing the maps for World Mapping Web Services. The web-service proxy isoproc 240 is responsible handling requests from the extension isoproc 220 and communicating with web service servers 250. To do this, any effective and available protocol, such as SOAP, may be employed. In an alternative embodiment, the web-service proxy isoproc 240 can be replaced when the filtering features of code for the web-service proxy isoproc 240 are verifiably inserted into the extension isoproc 220 code.

As depicted, channels 232 and 242 are the only two OS-provided cross-process communication channels the extension isoproc 220 has express permission to use.

The network service isoproc 230 and the web-service proxy isoproc 240 may be generically called "mediators." That is because they act as intermediaries or mediators between the extension isoproc 220 and other data sources, such as web service servers 250 and the Internet 260.

Each isoproc has a separate and distinct interface to the OS kernel (commonly called an Application Programming Interface (API) or an Application Binary Interface (ABI)) through which each isoproc can request computation resources from the OS, such as create a new thread of execution, but cannot directly affect the state of any other isoproc. This interface allows the extension isoproc 220 to control its own execution, but it cannot affect the execution of other isoprocs. By design, this interface cannot be subverted as a mechanism for cross-process communication. An isoproc's interface to the kernel cannot be intercepted, modified, or its contents snooped, without explicit permission of the isoproc's developer.

With this exemplary environment:

The extension isoproc 220 can only communicate with a mediator, such the network service isoproc 230 and the web-service proxy isoproc 240.

The author of the extension isoproc 220 does not need to write distributed code when the mediators handle all of the distributed computing issues. This is desirable because the web services developers have typically already determined how to use know distributed computing solutions to make their web service highly available. They can reuse these same technologies in the mediators.

The extension isoproc 220 communicates with both the mediators (and any other isoproc) through fully-specified, statically verifiable contracts.

Many of these extension isoprocs may be hosted on a single server because the extension isoprocs are small (typically, overhead is <400 KB of RAM). Also, there are little to none of the multiplexing issues found in Virtual Machine Monitors While much of the focus of the discussion herein has been on Internet scenarios, the techniques described herein are applicable to wide range of computation scenarios. For example, the "web service" that is being extended may actually be any arbitrary computation node, such as a mobile phone device or personal computer. It could even be an arbitrary computation system, such as a peer to peer or grid network.

Consider a project like the SETI@home distributed processing system for analyzing radio signals. In this setup, each of the owners of each personal computer participating need to "trust" the SETI@home software to not be malicious. However, to ensure that level of trust, this SETI@home software is relatively fixed and unchangeable. Consequently, it is not possible for an arbitrary astronomer to for example, quickly use the resources of those thousands of computers to evaluate a new radio signal analysis algorithm. Using the techniques described herein, the software could be modifiable and still be trusted.

This scenario is analogous to the web services scenarios described earlier, only in this case, the "commercial web service" is actually a distributed computation grid. Either way, it can be modeled as a web service needing extensions.

Methodological Implementation

Figure 3:
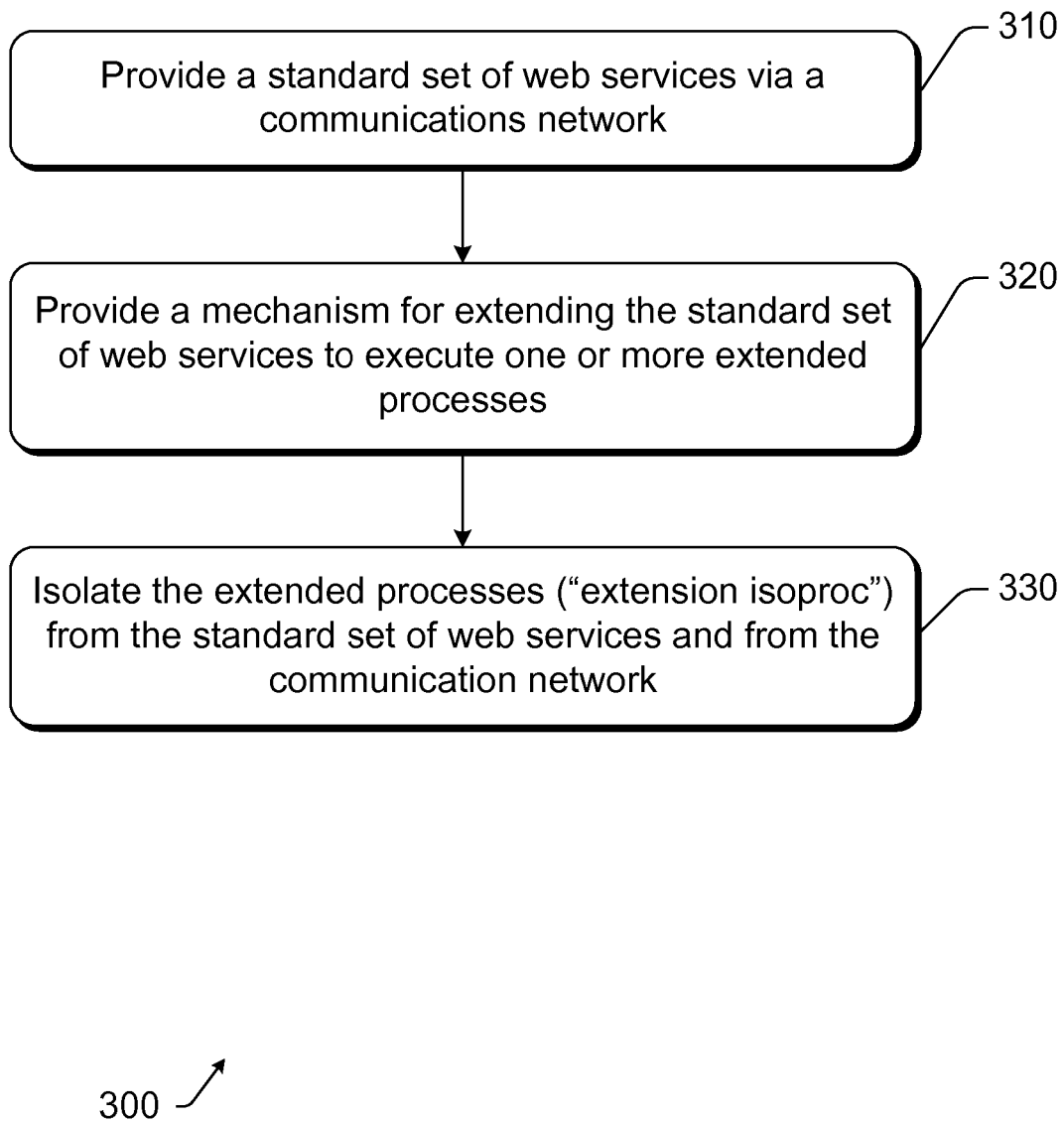
FIG. 3 is a flow diagram showing a methodological implementation described herein.

FIG. 3 shows method 300 for providing a secure, stable, reliable, and scalable computing operating environment for isolated web services extensions. This method 300 is performed by the one or more of the various components as depicted in FIGS. 1 and/or 2. Furthermore, this method 300 may be performed in software, hardware, firmware, or a combination thereof.

For ease of understanding, this method is delineated as separate steps represented as independent blocks in FIG. 3; however, these separately delineated steps should not be construed as necessarily order dependent in their performance. Additionally, for discussion purposes, the method 300 is described with reference to FIGS. 1 and/or 2. Also for discussion purposes, particular components are indicated as performing particular functions; however, other components (or combinations of components) may perform the particular functions.

At 310 of FIG. 3, a computer operating environment (such as web-services host computing environment 200) provides a standard set of web services via a communications network (such as the Internet 260).

At 320, the computer operating environment provides a mechanism for extending the standard set of web services to execute one or more extended processes.

At 330 of FIG. 3, the computer operating environment isolates the extended processes ("extension isoproc") from the standard set of web services and from the communication network. The web services are other isoprocs. Each isoproc's ability to communicate is limited to only defined communication channels over which it has express permission to communicate.

Conclusion

The techniques, described herein, may be implemented in many ways, including (but not limited to) program modules, general- and special-purpose computing systems, network severs and equipment, dedicated electronics and hardware, and as part of one or more computer networks. The techniques, described herein, may be implemented.

Although the one or more above-described implementations have been described in language specific to structural feature and/or methodological step, it is to be understood that other implementations may be practiced without the specific feature or steps described. Rather, the specific feature and step are disclosed as preferred forms of one or more implementations.

The invention claimed is:

1. One or more computer operating environments, comprising:
   a host computing system, having one or more processing cores and one or more memory subsystems, configured to execute computer-executable instructions of an operating system (OS) which support and provide at least a first executing isolation process (isoproc) and a second executing isoproc that execute on the OS;
   an isolation boundary provided by the OS for each executing isoproc, wherein the isolation boundary includes a separate and distinct interface between the OS and each executing isoproc; and
   one or more defined typed communication channels between the first executing isoproc and the second executing isoproc, wherein each executing isoproc is capable of communication with the other executing isoproc via the one or more defined communication channels therebetween;
   a communication-channel regulator of the OS configured to selectively grant the first executing isoproc express permission to communicate over the one or more defined typed communication channels to the second executing isoproc, wherein the express permission defines communication properties of the one or more defined typed communication channels, and wherein the first executing isoproc is capable of accessing resources on the host computing system via the second executing isoproc across the one or more defined typed communication channels; and
   a cloaking or filtering mechanism configured to hide data from the executing isoprocs by replacing the data with replacement data.

2. One or more computer operating environments as recited in claim 1, wherein the first executing isoproc is selected from a group consisting of a hardware isolation process (HIP), firmware isolation process (FIP), and software isolation process (SIP).

3. One or more computer operating environments as recited in claim 1, wherein the express permission granted by the communication-channel regulator defines communications properties of the one or more typed defined communication channels between the first and second executing isoprocs, wherein the communications properties include one or more of the following:
   with which executing isoprocs the first executing isoproc may communicate;
   with which executing processes on the system the first executing isoproc may interact;
   ability to access communication mechanisms to communicate with other systems;
   ability to communicate with specific systems;
   type of communication; or
   rate, amount, and time of communication.

4. One or more computer operating environments as recited in claim 1, further comprising a mediator configured to mediate communication via at least the first and the second executing isoprocs over the one or more defined typed communications channels therebetween.

5. One or more computer operating environments as recited in claim 1, wherein the one or more computing operating environments are at least one of: a web service, a large-scale multi-user distributed game, a large-scale multi-user simulator, or a massively multiplayer online game.

6. One or more computer operating environments as recited in claim 1, wherein the communication-channel regulator is further configured to prevent the first executing isoproc from directly affecting the execution of other executing isoprocs, which includes the second executing isoproc.

7. One or more computer operating environments as recited in claim 1, wherein the communication-channel regulator is further configured to prevent the first executing isoproc from communicating with other executing isoprocs except for the second executing isoproc.

8. One or more computer operating environments as recited in claim 1, wherein the communication-channel regulator is further configured to prevent the first executing isoproc from accessing resources of other executing isoprocs except for the second executing isoproc.

9. One or more computer operating environments as recited in claim 1, wherein the communication-channel regulator is further configured to prevent the first executing isoproc from communicating with other computing systems over a communications network that is external to the host computing system, unless the first executing isoproc is expressly permitted to do so.

10. One or more computer operating environments as recited in claim 9, further comprising a mediator configured to mediate communication via at least the first and second executing isoproc over the one or more defined typed communications channels therebetween and via a communications network external to the host computing system.

11. One or more computer operating environments as recited in claim 1, wherein the OS on which the executing isoprocs execute is not virtualized.

12. One or more computer-readable storage devices storing computer-executable instructions that, when executed by one or more processors, cause one or more processors to perform acts comprising:
   executing instructions of a defined standard isolation process (isoproc);
   executing instructions of an extended isoproc;

establishing one or more defined typed communication channels between the extended executing isoproc and the standard executing isoproc, each executing isoproc being capable of communication with the other executing isoproc via the one or more defined communication channels therebetween;

granting express permission for the extended executing isoproc to communicate over the one or more defined typed communication channels to the standard executing isoproc, wherein the express permission defines communication properties of the one or more defined typed communication channels, and wherein the extended executing isoproc is capable of accessing resources on a computing system via the standard executing isoproc across the one or more defined typed communication channels;

limiting the extended executing isoproc from communicating with other executing isoprocs; and hiding data from the extended executing isoproc by replacing the data with replacement data.

13. One or more computer-readable storage devices as recited in claim 12, wherein the defined standard isoproc represents a massively multiplayer online game (MMOG) and the extended executing isoproc is a modification to the MMOG.

14. One or more computer-readable storage devices as recited in claim 12, wherein the executing instructions of the extended executing isoproc is further characterized by the ability of the extended executing isoproc to communicate with an external communications network as provided by an express permission to communicate via a mediation isoproc.

15. One or more computer-readable storage devices as recited in claim 12, wherein the standard executing isoproc and the extended executing isoproc execute on a same non-virtualized operating system (OS).

16. One or more computer-readable storage devices storing computer-executable instructions that, when executed by one or more processors, cause one or more processors to perform acts comprising:

providing a standard set of web services via a communications network wherein the standard set of web services are comprised of executing isolation processes (isoprocs);

extending the standard set of web services to execute at least one extended process as an extension isoproc;

isolating the extension isoproc from the standard set of web services and from the communication network, wherein the isolating includes:

establishing one or more defined typed communication channels between the executing extension isoproc and at least one of the executing isoprocs of the standard set of web services, the at least one executing isoproc being capable of communication with the other executing isoprocs via the one or more defined communication channels therebetween; and granting express permission for the executing extension isoproc to communicate over the one or more defined typed communication channels to the at least one executing isoproc, wherein the express permission defines communication properties of the one or more defined typed communication channels, and wherein the executing extension isoproc is capable of accessing resources on a computing system via at least one of the executing isoprocs across the one or more defined typed communication channels; and hiding data associated with the web services from the one or more isoprocs by replacing the data with replacement data unrelated to the web services.

17. One or more computer-readable storage devices of claim 16, wherein each of the member of the standard set of web services and the extension isoproc is selected from a group consisting of a hardware isolation process (HIP), firmware isolation process (FIP), and software isolation process (SIP).

18. One or more computer-readable storage devices of claim 16, wherein the isolating act prevents the extended processes from impersonating the standard set of web services.

19. One or more computer-readable storage devices of claim 16, wherein the isolating act defines with which other processes the extension isoproc may communicate and regulating such communication therebetween.

20. One or more computer-readable storage devices of claim 16, wherein the executing extension isoproc and the at least one executing isoproc execute on a same non-virtualized operating system (OS).

* * * * *